United States Patent [19]

Shida et al.

[11] 4,087,587

[45] May 2, 1978

[54] ADHESIVE BLENDS

[75] Inventors: Mitsuzo Shida, Barrington; John Machonis, Jr., Schaumburg; Seymour Schmukler; Robert J. Zeitlin, both of Palatine, all of Ill.

[73] Assignee: Chemplex Company, Rolling Meadows, Ill.

[21] Appl. No.: 808,079

[22] Filed: Jun. 20, 1977

Related U.S. Application Data

[63] Continuation-in-part of Ser. No. 616,374, Sep. 19, 1975, abandoned.

[51] Int. Cl.$^2$ ............................................. C08L 51/00
[52] U.S. Cl. ................................ 428/500; 260/876 R; 428/521
[58] Field of Search ............... 260/876 R; 428/500, 428/521

[56] References Cited

U.S. PATENT DOCUMENTS

| 3,177,269 | 4/1965 | Nowak | 260/878 |
| 3,658,948 | 4/1972 | McConnell | 260/897 B |
| 3,856,889 | 12/1974 | McConnell | 260/897 B |
| 3,868,433 | 2/1975 | Bartz | 260/876 R |
| 3,873,643 | 5/1975 | Wu | 260/878 R |
| 3,882,194 | 5/1975 | Krebaum | 260/878 R |

*Primary Examiner*—Paul Lieberman
*Attorney, Agent, or Firm*—Wegner, Stellman, McCord, Wiles & Wood

[57] ABSTRACT

Compositions of matter having among other desirable characteristics strong adhesive properties to various substrates, these compositions comprising blends of a graft copolymer of a high density polyethylene and at least one unsaturated fused ring carboxylic acid anhydride blended with a polyethylene resin of one or more homopolymers of ethylene, copolymers of ethylene and an alpha-olefin or any or all of these.

54 Claims, No Drawings

ADHESIVE BLENDS

CROSS-REFERENCE TO RELATED APPLICATION

This application is a continuation-in-part of our copending application Ser. No. 616,374, filed Sept. 19, 1975.

BACKGROUND OF THE INVENTION

Various polymer and resin mixtures have been proposed for adhesives with strong bonding properties for various substrates and these have been successful to varying degrees. However, the blends of this invention have remarkably superior properties when used as adhesives. Thus the object of this invention is to provide modified polyolefin resins with improved adhesion to substrates such as polar polymers, metals, glass, paper, wood, etc. These resins can be applied in any conventional manner and typical application processes are lamination, extrusion coating, coextrusion, powder coating, blow molding, etc.

It is well known that laminates of polyolefins with dissimilar substrates have many desirable characteristics. Among these are heat sealability and barrier properties. However, it is often difficult to bond polyolefins to dissimilar substrates because of the differences in physical and chemical structures. To overcome the bonding difficulties, it has been proposed in the past to use either an adhesive layer between the polyolefin and the substrate or a more expensive, highly polar copolymer of the olefin such as an ionomer resin in place of the conventional polyolefin. This latter is not entirely successful because, although the ionomer resin may show good adhesion, the bond formed is easily weakened by exposure to moisture or common solvents.

Another method for improving the adhesion of a polyolefin to a substrate is to graft polar functional groups onto the polyolefin backbone chain. The most common combination is maleic anhydride grafted to polypropylene. However, grafting of maleic anhydride on a polyethylene backbone when applied as in this invention does not give the adhesive power of the products of this invention.

SUMMARY OF THE INVENTION

By grafting suitable unsaturated fused ring carboxylic acid anhydrides to a high density polyethylene and blending the resultant graft copolymer with a polyethylene resin that is either a homopolymer of ethylene, a copolymer of ethylene and an alpha-olefin, or a terpolymer of ethylene, an alpha-olefin and a diene or a mixture of these, we have obtained composites with excellent adhesive strength to various substrates including polar polymers, metals, glass, paper, wood and the like. These composites also have exceptional heat sealability. Furthermore, the adhesive bond formed is not easily affected by moisture or common solvents. Surprisingly, the adhesive strength of the blends is synergistic in that it is better than that of either component when tested alone. This occurs despite the fact that the concentration of fused ring, carboxylic acid anhydride in the blends is reduced by dilution with the ungrafted resin component.

The blends of graft copolymer and ethylene polymer or copolymer of this invention have improvements over previous systems of which applicants are aware and these improvements include: eliminating the need for additional adhesive layers when bonding unmodified polyolefins to dissimilar substrates; economic advantages due to eliminating the need to use costly, highly polar copolymers of olefins; excellent bond strength; and moisture and solvent insensitivity of the adhesive bond between the blends of this invention and various substrates.

According to this invention, there are provided blends of polyethylene polymers with copolymers comprising polyolefins which are modified by grafted unsaturated fused ring, carboxylic acid anhydride monomers to exhibit improved adhesion to various substrates.

When a high density polyethylene polymer or copolymer is applied to a substrate such as aluminum or nylon, little or no adhesion is seen as is well known in the art. When a polyethylene graft coopolymer prepared, for example, according to U.S. Pat. Nos. 3,873,643 or 3,882,194, is applied to nylon, the adhesion is poor, but when a blend of a graft copolymer and high density homopolymer is applied to nylon, the resulting blend has excellent adhesion to nylon. Surprisingly, the adhesion of the blends is better than that of either component when tested alone. This occurs despite the fact that the concentration of the graft copolymer in the blend is reduced by dilution with the ungrafted resin component. Similarly, the same synergistic effect of increased adhesion is observed when using ethylene hexene-1 copolymer, ethylene-propylene-diene terpolymer, low density polyethylene homopolymer or mixtures of any or all of these as blending resins.

The graft copolymers disclosed herein are described and claimed in the above U.S. Pat. Nos. 3,873,643 and 3,882,194, both assigned to the assignee hereof.

DESCRIPTION OF THE PREFERRED EMBODIMENTS

The term "high density polyethylene" used herein for the grafting backbone includes polymers of ethylene and copolymers with propylene, butene and other unsaturated aliphatic hydrocarbons. These high density polyethylenes and copolymers are prepared usually using transitional metal catalysts and are also often referred to as low or medium pressure polyethylenes as opposed to low density polyethylene which often involves high pressure and free radical initiators. Preferably, such high density polyethylene has a density of about 0.930 – 0.970. Also, it is preferable sometimes to graft to blends of two or more of the above homopolymers and copolymers.

The term "polyolefin" used herein for the blending resin includes ethylene polymers and copolymers of ethylene with propylene, butene and other unsaturated aliphatic hydrocarbons. Especially preferable in this invention are ethylene homopolymers prepared by either the low or high pressure methods (linear or high density polyethylenes and branched or low density polyethylenes, respectively) and such copolymers of ethylene with up to 40 weight percent of such higher olefins such as propylene, 1-butene and 1-hexene and which may contain up to 5 weight percent of such di- or triolefins as are used commercially in ethylenepropylene terpolymers such as ethylidenenorbornene, methylenenorbornene, 1,4-hexadiene and vinylbornene. It is preferable sometimes to use blends of two or more of the above homopolymers, copolymers and terpolymers as the blending resin.

The unsaturated fused ring carboxylic acid anhydrides used as the grafting monomers are compounds which contain one or more carbocyclic, acyclic, polycyclic and/or heterocyclic moieties not including the anhydride ring.

Fused ring is defined in the "International Encyclopedia of Chemical Science", D. Van Nostrand Co., Inc., Princeton, New Jersey, 1964 as "a structural element in the formula of a chemical compound consisting of two rings that are joined by having two atoms in common".

The compounds may be simple, bridged, carbocyclic, heterocyclic, polycyclic or complex. These compounds may contain up to 35 carbon atoms. These classes are represented respectively by the following structures which are meant to be illustrative rather than limiting:

polymer is recovered for later blending with the polyethylene resin. The term "recovered" means any method or system which separates the graft copolymer that is produced. Thus, the term includes recovery of the copolymer in the form of precipitated fluff, pellets, powders and the like.

Any of the commonly known hydroperoxides which have a half life of at least one minute at 145° C. may be used as an initiator. Such hydroperoxides have the general formula R—O—OH wherein R is an organic radical. Among the suitable hydroperoxides are t-butyl hydroperoxide, p-menthane hydroperoxide, pinane hydroperoxide, and cumene hydroperoxide, as well as

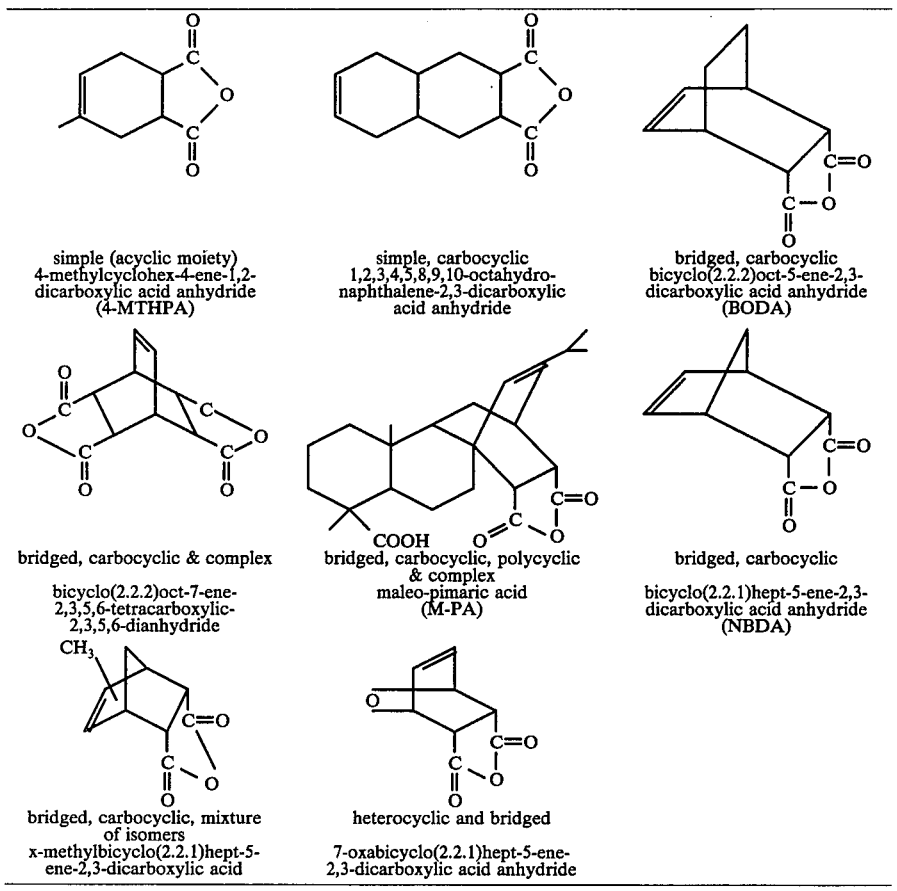

It is often desirable in making the graft copolymers to use more than one monomer in order to control the physical properties of the final graft copolymers.

The method of making the graft copolymers of the blends of this invention consists in general of heating a mixture of the polymer or polymers and the monomer or monomers to be grafted in a solvent or above the melting point of the polyolefin with or without an initiator. Thus, the grafting occurs in the presence of air, hydroperoxides, other free radical initiators or in the essential absence of these materials where the mixture is maintained at elevated temperatures and preferably under high shear.

In making the graft copolymers used in this invention, the mixture of high density polyethylene or its copolymers and monomer or monomers is heated in a solvent or above the melting point of the polyethylene at reaction temperatures and under reacting conditions described below and thereafter the resulting graft coothers known in the art. The elevated temperature causes rapid decomposition of the hydroperoxide which initiates the reaction between the polyolefin and monomer to form the graft copolymer.

Obviously, the more homogeneous the mixture prior to heating, the less mixing will be required of the solution or molten composition. Generally, in order to obtain a desirable conversion, it has been found that some form of mixing is highly desirable in the absence of a solvent even when a uniform mixture of all of the components of the composition is formed prior to heating. In general, when a solvent is not used, the composition should be heated to a temperature above about 130° C., and it is preferred to use the temperatures ranging from about 200° to about 360° C. Temperatures substantially above about 360° C. are generally to be avoided in order to avoid substantial decomposition of the polymeric ingredients. The reaction time required is quite short, being of the magnitude of from a few seconds to about 20 minutes, although extended heating times do not substantially affect the product and may be employed when desired.

A convenient method of accomplishing the grafting reaction is to premix the ingredients and then extrude the composition through a heated extruder. Other mixing means, such as a Brabender mixer, a Banbury mixer, roll mills and the like may also be employed for the process. In order to prevent undue increase in molecular weight with a possibility of some cross-linking at elevated temperatures, it is desirable to carry out the reaction in a closed reaction vessel. A conventional single or multiple screw extruder accomplishes this result without the use of auxiliary equipment and for this reason is a particularly desirable reaction vessel, although it is by no means necessary.

The resulting graft copolymers used in the blends of this invention are found to consist of about 70–99.999 weight percent of high density polyethylene or copolymers and about 30–0.001 weight percent of the unsaturated fused ring carboxylic acid anhydride, especially preferred is about 0.001–5 wt.% of anhydride in the graft copolymer, and these resulting graft copolymers are capable of blending with a wide variety of polyethylene resins to produce the adhesive compositions of this invention.

Excellent monomers in the graft copolymer of this invention include 4-methylcyclohex-4-ene-1,2-dicarboxylic acid anhydride, tetrahydrophthalic anhydride, x-methylnorborn-5-ene-2,3-dicarboxylic anhydride, norborn-5-ene-2,3-dicarboxylic anhydride, maleo-primaric acid, and bicyclo(2.2.2)oct-5-ene-2,3-dicarboxylic anhydride.

It is preferred in this invention first to prepare a high density polyethylene in which a graft monomer is grafted in a high concentration and then the modified polyethylene can then be blended with a wide variety of non-grafted polyolefins so that we can control not only the amount of graft copolymer in the blend but also properties of the blends. The amount of graft copolymer in the blend is determined by the amount required to attain maximum adhesion with the substrate being used. These substrates include polar polymers, wood, metal, glass, cellophane, paper and many others.

The following examples illustrate the preparation of the graft copolymers of the blends of this invention and the methods by which they are made.

EXAMPLE 1

An electrically heated C. W. Brabender, Inc. mixing head was modified so that it could hold pressure. To this reactor was charged a mixture of 8.36 parts of NBDA, 0.68 parts of t-butyl hydroperoxide (TBHP) and 90.96 parts of a high density polyethylene powder having an HLMI of 7. The reactor was closed, purged with nitrogen and vacuumed until free of oxygen and heated to 260° C. After reaching 160° C. agitation was started at 160 rpm. After 15 minutes at 260° C. and 160 rpm, the mixture was cooled, quenched in cold hexane, dissolved in trichlorobenzene at 130° C. precipitated in cold methylethylketone and dried at 95° C. and 0.2 mm mercury absolute pressure overnight. The product contained 1.68 weight percent NBDA by elemental analysis. The HLMI of the product was 0.11. For higher MI products, a higher shear reactor can be used as shown in the following Examples 2 through 13.

EXAMPLE 2

The same equipment as in Example 1 was charged with 8.36 parts of NBDA and 91.64 parts of the polyethylene of Example 1. The conditions now were 300°–310° C. at 275 rpm for 15 minutes in an oxygen-free atmosphere. The product, after recovery in the same manner, contained 4.75 weight percent NBDA by elemental analysis and the HLMI was 1.83. Thus, at the higher temperature and rpm, graft level and HLMI are higher.

EXAMPLES 3 (COMPARATIVE) AND 4

Under the same conditions as Example 2, except that the reaction times were only 5 minutes, maleic anhydride (MA) and XMNA were grafted to a polyethylene of HLMI = 7 with the results shown in Table I.

TABLE I

| Example No. | Anhydride | Wt.% Anhydride Charged | Wt.% Grafted Anhydride | Product HLMI |
|---|---|---|---|---|
| 3 | MA | 5.00 | 2.62 | 1.50 |
| 4 | XMNA | 9.08 | 1.56 | 12.08 |

The product of XMNA grafting is clearly more processable than the product of MA grafting. When MA was reacted for 15 minutes as in Example 2, the product HLMI was too low to measure.

EXAMPLES 5 THROUGH 8

Under the same conditions and in the same equipment as in Example 2, a variety of fused ring anhydrides were grafted to polyethylene with the results shown in Table II. In all cases, the HLMIs of the graft polymer product were higher than the starting polyethylene.

TABLE II

| Example No. | Anhydride Monomer | Wt.% Anhydride Charged[1] | Wt.% Grafted Anhydride[2] | Product HLMI |
|---|---|---|---|---|
| 5 | XMNA | 9.08 | 3.01 | 8.26 |
| 6 | 4-MTHPA | 8.47 | 1.11 | 20.38 |
| 7 | BODA | 9.08 | 3.98 | 9.01 |
| 8 | Maleo-Pimaric Acid | 20.42 | 2.34 | 10.57 |

[1]Amounts charged are equimolar and equivalent to 5.0 weight percent MA.
[2]After solution and precipitation as in Example 1 to remove monomers and ungrafted homopolymers.

EXAMPLE 9

A mixture of 15 pounds tetrahydrophthalic anhydride (THPA) and 150 pounds of high density polyethylene (7HLMI) is prepared by spraying an acetone solution of THPA onto the high density polyethylene powder of Example 1 followed by evaporation of the solvent. This mixture is fed to a corotating twin-screw extruder equipped with five heating zones. The feed rate is about 50 pounds per hour (pph) and the screw speed is 300 rpm. The temperature profile is Zone 1 = 200° C., Zone 2 = 270° C., Zone 3 = 320° C., Zone 4 = 270° C., Zone 5 = 230° C., and die temperature = 180° C. To Zone 2 is added a mixture of catalyst (TBHP) and solvent (o-dichlorobenzene, ODCB) at a rate of about 0.3 pph TBHP and 3.1 pph ODCB. The reaction mixture is devolatilized at Zone 4.

The properties of the resulting polyethylene/THPA graft copolymer are shown below:

| | |
|---|---|
| Percent THPA incorporation | 0.5 |

| -continued | |
|---|---|
| Melt Index | 0.24 |
| Tensile yield, psi | 4560 |
| Tensile break, psi | 3290 |
| Elongation, percent | 850 |

EXAMPLE 10

A mixture of 15 pounds NBDA and 150 pounds high density polyethylene (7 HLMI) is prepared by spraying an acetone solution of NBDA onto the high density polyethylene powder of Example 1 followed by evaporation of the solvent. This mixture is fed to a corotating twin-screw extruder equipped with five heating zones. The temperature profile is Zone 1 = 200° C., Zone 2 = 270° C., Zone 3 = 320° C., Zone 4 = 270° C., Zone 5 = 230° C. and die temperature = 180° C. To Zone 2 is added about 0.4 pph TBHP and 4.7 pph ODCB. The reaction mixture is devolatilized at Zone 4.

The properties of the resulting polyethylene/NBDA graft copolymer are shown below:

| Percent NBDA incorporation | 3.3 |
|---|---|
| Melt Index | 0.16 |
| Tensile yield, psi | 4030 |
| Tensile break, psi | 2630 |
| Elongation, percent | 400 |

EXAMPLE 11

High density polyethylene (7 HLMI) is fed to a corotating twin-screw extruder equipped with five heating zones. The feed rate is about 50 pph and the screw speed is 225 rpm. The temperature profile is Zone 1 = 200° C., Zone 2 = 270° C., Zone 3 = 320° C., Zone 4 = 270° C., Zone 5 = 230° C. and die temperature = 180° C. To Zone 2 is added a mixture of XMNA and t-butyl hydroperoxide (TBHP) at a rate of about 6 pph XMNA and 0.3 pph TBHP. The reaction mixture is devolatilized at Zone 4.

The properties of the resulting polyethylene/XMNA graft copolymer are shown below:

| Percent XMNA incorporation | 1.8 |
|---|---|
| Melt Index | 0.28 |
| Tensile yield, psi | 4090 |
| Tensile break, psi | 2560 |
| Elongation, percent | 1020 |

EXAMPLES 12 AND 13

High density polyethylene (7 HLMI) and, respectively, tetrahydrophthalic anhydride and bicyclo(2.2.1-)hept-5-ene-2,3-dicarboxylic acid anhydride are fed as dry blends to a corotating twin-screw extruder equipped with five heating zones. The feed rates are 50 pph of resin and 5 pph of anhydride. One percent by weight of TBHP catalyst as a 10% solution in ODCB is fed into Zone 2. The screw speed is 300 rpm. The temperature profile is Zone 1 = 200° C., Zone 2 = 270° C., Zone 3 = 320° C., Zone 4 = 270° C., Zone 5 = 230° C. and die temperature = 180° C. The reation mixture is devolatilized at Zone 4 and recovered.

EXAMPLES 14–16

A high density ethylene-hexene-1 copolymer (8 HLMI, 0.943 density) is fed to a corotating twin-screw extruder equipped with five heating zones. The feed rate is about 50 pph and the screw speed is 250 rpm. The temperature profile is Zone 1 = 200° C., Zone 2 = 270° C., Zone 3 = 320° C., Zone 4 = 270° C., Zone 5 = 230° C. and die temperature = 180° C. The monomer(s) with dissolved catalyst are added to Zones 2 and 3 at equal rates. The mixture is devolatilized at Zone 4.

Monomer feed concentrations and properties of the graft copolymers are given below:

TABLE III

| Exam. No. | FEED | | | GRAFT COPOLYMERS | | |
|---|---|---|---|---|---|---|
| | XMNA Wt.% | DBM Wt.% | TBHP Wt.% | M.I. | % XMNA | % DBM |
| 14 | 3.8 | none | none | 0.66 | 1.2 | none |
| 15 | 3.0 | 4.9 | 0.25 | 0.83 | 1.5 | 0.2 |
| 16 | 3.0 | 15.2 | 0.75 | 0.64 | 1.4 | 1.1 |

Thus, cografting is readily achieved with XMNA and dibutyl maleate (DBM).

EXAMPLE 17

An electrically heated C. W. Brabender, Inc. mixing head was modified so that it could hold pressure. To this reactor was charged a mixture of 5.0 parts of NBDA, 5.0 parts of diethyl fumarate (DEF), 0.1 part of TBHP and 89.9 parts of high density polyethylene (7 HLMI). The reactor was closed, purged with nitrogen and vacuumed until essentially free of oxygen and heated to 300° C. Agitation at 275 rpm was started when the temperature reached 160° C. After 15 minutes at 300° C. and 275 rpm, the mixture was removed from the reactor, quench cooled in hexane, dissolved in trichlorobenzene at 130° C., precipitated in cold methylethylketone and dried at 95° C. and 0.2 mm mercury absolute pressure overnight. The precipitated product contained 2.3% by weight of NBDA mers and 1.7% by weight of DEF mers. The HLMI of the gross product was 10.8. Thus, cografting is readily achieved with NBDA and DEF as well as with XMNA and DBM.

In preparing the blends of this invention from the above graft copolymers and the polyethylene resin or resins any blending equipment or technique may be used. As an example only, all of the blends were prepared in an electrically heated Brabender Plasticorder mixing head using a scroll type mixer under the following conditions: temperature = 350° F., rotor speed = 120 rpm and mixing time = 5 minutes after flux.

EXAMPLE 18

XMNA is reacted with high density polyethylene homopolymer resin in a twin-screw extruder to give a graft copolymer resin with 1.0 weight percent XMNA incorporation and a melt index of 0.8 gm/10 min. The above graft copolymer is blended in varying amounts with a high density polyethylene homopolymer resin of a melt index of 0.21 gm/10 min. and a density of 0.96 gm/cc using the procedure described above. The blends as well as the graft copolymer resin itself and the high density polyethylene homopolymer resin itself are tested for adhesion to nylon 6 film using the following procedure.

The resultant blends were compression molded into films approximately 0.006 inch thick at 350° F. The films were then pressed to the substrate under evaluation in a Pasadena Hydraulic compression molding press having plates 8 inches × 8 inches. The samples to be tested were held at 400° F. for 3 minutes at 1000 psig followed by quenching in a cold Pasadena Hydraulic Press held at 4000 psig. Slip sheets were used between the blend and the substrate in order to provide a tab for subsequent testing of the composite.

The resultant composites were tested by cutting into strips of varying widths from 1/16 inch to ½ inch. The tab of the test substrate is attached to a fixed support and weights were hung in increments of 50 grams to the tab of the test film forming a 180° peel angle. Attempts were made to maintain an angle of 90° between the peel angle and the composite under test. The width of the test strip and the number of weights required to completely separate the composite were recorded.

The T-peel test described above is similar to the test described by Dickert et al in Tappi, Vol. 51, No. 6, June, 1968, on page 66A, except that the Tappi test used 30 grams weights and a one minute interval was used before the next weight was added. The point of failure in our test is the actual number of weights put on the sample rather than subtracting one-half of the last weight as described in Dickert et al.

The procedure herein described is also related to ASTM D 1876-72 T-peel strength of adhesives with the following differences:

1. A motor driven instrument is used in ASTM D 1876-72 and the test panel is 12 inches long by 6 inches wide. The first 3 inches of length are bent back to form a 90° bend.
2. The separation rate of the bond is 5 inches per minute.
3. The strip width is one inch.
4. The peel strength is determined from the autographic curve for the first 5 inches of peeling after the initial peak.
5. The average peeling load in pounds per inch of the specimen width required to separate the adherends is reported.

The results obtained are summarized below:

| Graft Copolymer in Blend (wt.%) | Adhesion to Nylon 6 | |
|---|---|---|
| | No. of Weights (1/16" strip) | No. of Weights (1/2" strip) |
| 0 | <1 | <1 |
| 5 | 11 | >11 |
| 10 | 4 | >11 |
| 25 | 3 | 11 |
| 50 | 3 | 9 |
| 75 | 2 | 6 |
| 90 | <1 | 3 |
| 100 | <1 | 2 |

As shown by the table, surprisingly, the adhesion of the blends is better than that of either component when tested alone. This occurs despite the fact that the concentration of anhydride in the blends is reduced by dilution with the ungrafted resin component.

EXAMPLE 19

The graft copolymer resin described in Example 18 is blended at the 3 weight percent level with an ethylene-hexene-1 copolymer resin of a melt index of 0.26 gm/10 min. and a density of 0.95 gm/cc. The blend as well as the graft copolymer resin itself and the ethylene-hexene-1 copolymer resin itself are tested for adhesion to both nylon 6 film and aluminum foil. The results obtained are summarized below:

| Graft Copolymer in Blend (wt.%) | Adhesion to Nylon 6 No. of Weights (1/16" strip) | Adhesion to Aluminum No. of Weights (1/16" strip) |
|---|---|---|
| 0 | <1 | <1 |
| 3 | >11 | 6 |
| 100 | <1 | 4 |

As shown by the above data, alpha-olefin copolymers of ethylene may be used as the blend resin with excellent results. Furthermore, the adhesion of the blend is better than that of either component when tested alone to various substrates, e.g., nylon and aluminum.

EXAMPLE 20

The graft copolymer resin described in Example 18 is blended at the 5 weight percent level with an ethylene-propylenediene terpolymer resin manufactured by Copolymer Rubber and Chemical Corporation and designated Epsyn 5509. The blend as well as the graft copolymer resin itself and the EPDM resin itself are tested for adhesion to nylon 6 film. The results obtained are summarized below.

| Grafted Copolymer in Blend (wt.%) | Adhesion to Nylon 6 No. of Weights (1/16" strip) |
|---|---|
| 0 | <1 |
| 5 | 8 |
| 100 | <1 |

As shown above, terpolymers of ethylene, an alpha-olefin and a diene may be used as the blend resin with excellent results.

EXAMPLE 21

The graft copolymer resin described in Example 18 is blended at the 3 weight percent level with a low density polyethylene homopolymer resin of a melt index of 3.4 gm/10 min. and a density of 0.935 gm/cc. The blend as well as the graft copolymer resin itself and the low density polyethylene resin itself are tested for adhesion to both nylon 6 film and aluminum foil. The results obtained are summarized below:

| Graft Copolymer in Blend (wt.%) | Adhesion to Nylon 6 No. of Weights (1/16" strip) | Adhesion to Aluminum No. of Weights (1/16" strip) |
|---|---|---|
| 0 | <1 | <1 |
| 3 | 4 | 7 |
| 100 | <1 | 4 |

As shown by the above data, low density homopolymers of ethylene may be used as the blend resin with excellent results. Again, the adhesion of the blend is better than that of either component when tested alone to various substrates, e.g. nylon and aluminum.

EXAMPLE 22

XMNA together with dibutyl maleate (DBM) are reacted with an ethylene-butene-1 copolymer resin in a twin-screw extruder to give a cografted copolymer resin with 1.4 weight percent XMNA and 1.1 weight percent DBM incorporation and a melt index of 0.64 gm/10 min. The above graft copolymer is blended at the 3 weight percent level with an ethylene-hexene-1 copolymer resin of a melt index of 0.26 gm/10 min. and a density of 0.95 gm/cc. The blend as well as the graft copolymer resin itself and the ethylene-hexene copolymer resin itself are tested for adhesion to nylon 6 film. The results obtained are summarized below:

| Graft Copolymer in Blend (wt.%) | Adhesion to Nylon 6 No. of Weights (1/16" strip) |
|---|---|
| 0 | <1 |
| 3 | 7 |
| 100 | <1 |

As shown above, alpha-olefin copolymers of ethylene cografted with unsaturated fused ring carboxylic acid anhydride plus ester monomers may be used as the graft copolymer component with excellent results.

EXAMPLE 23

The graft copolymer resin described in Example 18 is blended at the 5 weight percent level with a high density polyethylene homopolymer resin of a melt index of 0.21 gm/10 min. and a density of 0.96 gm/cc. The blend as well as DuPont Surlyn 1652 ionomer resin are tested for adhesion to nylon 6 film. As prepared, it required 5 weights to separate a 1/16 inch strip of the ionomer resin from the nylon film and 11 weights to separate a 1/16 inch strip of the graft copolymer blend from the nylon film. If a drop of water is placed at the point of separation of the test film and nylon film, one weight is sufficient to completely separate the ionomer resin film from the nylon film, whereas, 11 weights are required to separate the graft copolymer blend film from the nylon film with or without the drop of water. This shows that the adhesive bond formed between the ionomer resin and nylon is readily affected by moisture, whereas, the adhesive bond formed between the graft copolymer blends and nylon is not easily affected by moisture.

EXAMPLE 24

The graft copolymer described in Example 18 is blended into a mixture of 30 weight percent of a terpolymer of ethylene, propylene and ethylidene norbornene and 70 weight percent of a high density polyethylene with a high load melt index of 13 and a density of 0.954. The graft copolymer itself, the mixture of the two polymers, and the graft copolymer blend were tested for adhesion to aluminum foil with the following results:

| Graft Copolymer in Blend (wt.%) | HDPE-EPDM Mixture | Adhesion to Aluminum No. of Weights 1/16" strip |
|---|---|---|
| 0 | 100 | <1 |
| 3 | 97 | 8 |
| 100 | 0 | 4 |

The results demonstrate that mixtures of ethylenepropylene terpolymer and high density polyethylene can be used as the blend resin with excellent results. Again, the adhesion of the blend is better than that of either component when tested alone.

EXAMPLE 25

XMNA is reacted with a high density polyethylene homopolymer resin in a twin-screw extruder to give a graft copolymer resin with 1.0 weight percent incorporation. The above graft copolymer is blended in varying amounts with a polyethylene homopolymer resin whose density is 0.96+ and melt index is 0.2.

For comparison purposes XMNA is reacted with a low density polyethylene homopolymer in a twin-screw extruder to give a graft copolymer with 1.0 wt.% XMNA incorporation. The graft copolymer is blended in varying amounts with the same polyethylene homopolymer described above.

The blends as well as the graft copolymers themselves and the polyethylene homopolymer itself are tested for adhesion to nylon 6 films. The results obtained are summarized below:

| XMNA Graft Copolymer prepared from HDPE (Wt.% in Blend) | Adhesion to Nylon 6 No. of Weights (1/16" strip) |
|---|---|
| 0 | <1 |
| 5 | 11 |
| 15 | 3 |
| 25 | 3 |
| 100 | <1 |

| XMNA Graft Copolymer prepared from LDPE (Wt.% in Blend) | Adhesion to Nylon 6 No. of Weights (1/16" strip) |
|---|---|
| 0 | <1 |
| 5 | <1 |
| 15 | <1 |
| 25 | <1 |
| 100 | <1 |

As shown by the table, surprisingly, the blends containing the high density polyethylene graft copolymer are adhesive to nylon whereas the blends containing the low density polyethylene graft copolymer are ineffective even though the grafting monomer and resultant graft incorporation are equivalent. Furthermore, it is surprising that the XMNA graft copolymer prepared from high density polyethylene when blended with high density polyethylene has adhesion to nylon that is greater than either component alone, i.e., a synergistic effect is obtained. These examples clearly indicate that the nature of the graft copolymer has to be very specific to produce effective adhesive blends. Not only does the anhydride have to be of a very specific type, i.e., fused ring, but also the polyethylene backbone must be high density.

EXAMPLE 26

Dexon 2000, a commercial polyethylene acrylic acid graft copolymer having an acrylic acid content of 1.0 wt.% is blended with a polyethylene homopolymer resin whose density is 0.96+ and whose melt index is 0.2 gm/10 min.

The blend, the blending resin, and the graft copolymer itself are tested for adhesion to nylon 6 film.

For comparison purposes XMNA is reacted with high density polyethylene homopolymer resin in a twin-screw extruder to give a graft copolymer with 1.0 wt.% XMNA incorporation. This graft copolymer is blended with the same resin and in the same proportion as the acrylic acid graft copolymer described above. The results are summarized as follows:

| Acrylic Acid Graft Copolymer in Blend (wt. %) | Adhesion to Nylon 6 No. of Weights (1/16" strip) |
|---|---|
| 0 | <1 |
| 5 | <1 |
| 100 | <1 |
| XMNA Graft Copolymer | Adhesion to Nylon 6 |

| in Blend (wt.%) | No. of Weights (1/16" strip) |
|---|---|
| 0 | <1 |
| 5 | >11 |
| 100 | <1 |

These examples show that the acrylic acid copolymer when blended with polyethylene does not have any adhesion to nylon. In comparison, the fused ring anhydride XMNA graft copolymer blend shows excellent adhesion to the non-porous nylon surface.

EXAMPLE 27

Dexon 1001, a commercial acrylic acid graft copolymer having a melt index of 50 and an acrylic acid graft content of 6 wt.% is blended in varying amounts with a high density polyethylene homopolymer resin of a melt index of 0.21 gm/10 min. and a density of 0.96 gm/cc. The blends as well as the graft copolymer resin itself, and the high density polyethylene homopolymer resin itself, are tested for adhesion to nylon 6 film. The results are summarized below:

| Graft Copolymer in Blend (wt. %) | Adhesion to Nylon 6 No. of Weights (1/16" strip) |
|---|---|
| 3 | <1 |
| 5 | <1 |
| 10 | <1 |
| 25 | <1 |
| 100 | <1 |

As can be seen, the acid graft copolymer blends do not have any adhesion to nylon. In comparison, a graft of this invention used at levels of 3 and 5 wt.%, when blended in the same manner, gives adhesion to nylon of 11 weights.

EXAMPLE 28

XMNA is reacted with a high density polyethylene homopolymer in a twin-screw extruder to give a graft copolymer resin with 1.0 wt.% incorporation and whose melt viscosity = $1.5 \times 10^5$ poise ($\eta A$). The above graft copolymer is blended with a polyethylene homopolymer resin whose density is 0.96+ and whose melt shear viscosity is $3.4 \times 10^7$ poise ($\eta B$) at the 5 wt.% level, where $\eta A$ is the shear viscosity of the graft copolymer and $\eta B$ is the shear viscosity of the blending resin.

For comparison purposes the high density graft copolymer resin described above is blended with a low molecular weight polyethylene homopolymer whose melt viscosity is $4 \times 10^2$ poise ($\eta B$) at the 5 wt.% level. The results obtained are summarized below:

| | Adhesion to Nylon No. of Weights (1/16" strip) | $\log \frac{\eta A}{\eta B}$ |
|---|---|---|
| XMNA Graft Copolymer blended with HDPE Homopolymer | 11 | <2 |
| XMNA Graft Copolymer blended with low MW Polyethylene | 0 | >2 |

The low molecular weight polyethylene does not satisfy the specification, $\log \eta A/\eta B < 2$, and the resultant blend does not show any adhesion; however, high molecular weight polyethylene satisfying the specification does exhibit strong adhesion.

EXAMPLE 29

Maleic anhydride is reacted with a high density polyethylene homopolymer resin in a twin-screw extruder to give a graft copolymer resin with 2.2 wt.% maleic anhydride incorporation and a high load melt index of 6.9 gm/10 min. The above graft copolymer is blended in varying amounts with a high density polyethylene homopolymer resin of a melt index of 0.21 gm/10 min. and a density of 0.96 gm/cc using the procedure described above. The blends as well as the graft copolymer resin itself and the high density polyethylene homopolymer resin itself are tested for adhesion to nylon 6 film using the procedure described above. The results are summarized as follows:

| Graft Copolymer in Blends (wt.%) | Adhesion to Nylon 6 No. of Weights (1/16" strip) |
|---|---|
| 3 | <1 |
| 5 | 1 |
| 10 | 1 |
| 25 | <1 |
| 100 | <1 |

This example shows that despite the fact that maleic anhydride is grafted to the exact same backbone as is XMNA and also blended with the exact same blending resin as in Example 18 for the XMNA, the adhesion of blends with maleic anhydride grafted copolymer is extremely poor when compared with those of an XMNA graft copolymer. This emphasizes that not all anhydrides are equivalent in producing blends for adhesion to a nylon 6 substrate.

EXAMPLE 30

The XMNA graft copolymer described in Example 18 is blended in varying amounts with a polyethylene copolymer of a melt index of 0.26 and a density of 0.953. The blends are tested for adhesion to nylon 6 as described above. The results are as follows:

| Graft Copolymer in Blends (wt.%) | Adhesion to Nylon 6 No. of Weights (1/16" strip) |
|---|---|
| 1 | 4 |
| 3 | >11 |
| 5 | 8 |
| 15 | 3 |

EXAMPLE 31

The maleic anhydride graft copolymer described in Example 29 is blended in varying amounts with a polyethylene copolymer of a melt index of 0.26 and a density of 0.953. The blends are tested for adhesion to nylon 6 as described above and with the following results:

| Graft Copolymer in Blends (wt.%) | Adhesion to Nylon 6 No. of Weights (1/16" strip) |
|---|---|
| 3 | 2 |
| 5 | 2 |
| 15 | <1 |

At equal weight percent of graft copolymer when compared to the XMNA grafted copolymer blends of Example 30, it can be seen that the adhesion of the latter is far superior to the blends of the maleic anhydride grafted copolymers. In fact, the adhesion to nylon of the blends of this Example 31 is poor. This emphasizes again that fused ring anhydride grafts are superior and not all anhydride-grafted copolymers are equivalent in adhesion to a typical substrate, namely nylon.

All parts and percentages herein are by weight.

A summarizing list of the abbreviations used herein to identify chemical ingredients is as follows:

| | |
|---|---|
| BODA | - bicyclo(2.2.2)oct-5-ene-2,3-dicarboxylic acid anhydride |
| DBM | - dibutyl maleate |
| DEF | - diethyl fumarate |
| EPDM | - ethylene-propylene diene terpolymer |
| 4-MTHPA | - 4-methylcyclohex-4-ene-1,2-dicarboxylic acid anhydride |
| HDPE | - high density polyethylene |
| LDPE | - low density polyethylene |
| MA | - maleic anhydride |
| NBDA | - bicyclo(2.2.1)hept-5-ene-2,3-dicarboxylic acid anhydride |
| ODCB | - o-dichlorobenzene |
| TBHP | - t-butyl hydroperoxide |
| THPA | - tetrahydrophthalic anhydride |
| XMNA | - x-methylbicyclo(2.2.1)hept-5-ene-2,3-dicarboxylic acid anhydride |

Having described our invention as related to the embodiments set out herein, it is our intention that the invention be not limited by any of the details of description, unless otherwise specified, but rather be construed broadly within its spirit and scope as set out in the appended claims.

We claim:

1. A modified polyolefin blend having improved adhesion to various substrates and consisting essentially of:
   (A) about 0.1-95 parts by weight in said blend of a graft copolymer of about 70-99.999 wt.% of a high density polyethylene backbone grafted with about 30-0.001 wt.% of at least one compound containing at least one member of the group consisting of unsaturated acyclic, carbocyclic, heterocyclic, and polycyclic moieties which are fused to at least one carboxylic acid anhydride-containing ring and
   (B) about 99.9-5 parts by weight of a polyethylene resin selected from the class consisting of homopolymers of ethylene, copolymers of ethylene and alpha-olefin, terpolymers of ethylene, alpha-olefin and diene and mixtures of these polyethylene resins.

2. The blend of claim 1 wherein said (B) resin comprises an ethylene homopolymer.

3. The blend of claim 1 wherein said (B) resin comprises a copolymer of ethylene and an alpha-olefin.

4. The blend of claim 1 wherein said (B) resin comprises a terpolymer of ethylene, alpha-olefin and diene.

5. The blend of claim 2 wherein said (B) comprises polyethylene of a density of from about 0.910-0.965.

6. The blend of claim 1 wherein said (B) comprises a linear copolymer of at least 60 wt.% of ethylene and up to 40 wt.% of an alpha-olefin containing 4-6 carbon atoms for a total of 100 wt.%.

7. The blend of claim 1 wherein said (B) comprises a terpolymer of ethylene, propylene and up to 5 wt.% for a total of 100 wt.% of a member of the group consisting of cyclic and acyclic aliphatic dienes and mixtures thereof.

8. The blend of claim 1 wherein said (B) comprises a mixture of ethylene polymers, ethylene-alpha-olefin copolymers and ethylene-propylene-diene terpolymers.

9. The blend of claim 1 wherein said (B) comprises a mixture of ethylene polymers and ethylene-alpha-olefin copolymers.

10. The blend of claim 1 wherein said graft copolymer of (A) comprises a high density polyethylene polymer and 4-methylcyclohex-4-ene-1,2-dicarboxylic acid anhydride.

11. The blend of claim 1 wherein said (B) comprises a mixture of ethylene polymers and ethylene-propylene-diene terpolymers.

12. The blend of claim 1 wherein said graft copolymer of (A) comprises a high density polyethylene polymer and at least one monomer comprising tetrahydrophthalic anhydride.

13. The blend of claim 1 wherein said carboxylic acid anhydride of (A) consists essentially of x-methyl bicyclo(2.2.1)hept-5-ene-2,3-dicarboxylic acid anhydride.

14. The blend of claim 1 wherein said (B) consists essentially of an ethylene-hexene-1 copolymer resin of a melt index of about 0.26 gm/10 min. and a density of about 0.96 gm/cc.

15. The blend of claim 1 wherein said (B) consists essentially of an ethylene-propylene-diene terpolymer resin.

16. The blend of claim 1 wherein said (B) consists essentially of a low density polyethylene homopolymer resin of a melt index of about 3.4 gm/10 min. and a density of about 0.935 gm/cc.

17. The blend of claim 1 wherein said polyethylene backbone consists essentially of a high density polyethylene having a density of about 0.930-0.970 gm/cc.

18. The blend of claim 1 wherein said compound is present in an amount of about 0.001-5 wt.% and said high density polyethylene backbone in an amount of about 99.999-95 wt.%.

19. The blend of claim 1 wherein said moiety is carbocyclic.

20. The blend of claim 1 wherein said compound contains up to about 35 carbon atoms.

21. The blend of claim 1 wherein said graft copolymer contains one or more of said anhydrides.

22. The blend of claim 1 wherein said polyethylene of (B) is selected to satisfy the equation:

$$\log \eta A/\eta B < 2, \text{ where}$$

$\eta A$ = the shear viscosity of graft copolymer
$\eta B$ = the shear viscosity of said polyethylene.

23. The blend of claim 1 wherein said carboxylic acid anhydride of (A) consists essentially of 4-methylcyclohex-4-ene-1,2-dicarboxylic acid anhydride.

24. The blend of claim 1 wherein said carboxylic acid anhydride of (A) consists essentially of bicyclo(2.2.2-)oct-5-ene-2,3-dicarboxylic acid anhydride.

25. The blend of claim 1 wherein said carboxylic acid anhydride of (A) consists essentially of bicyclo(2.2.1-anhydride of (A) consists essentially of bicyclo(2.2.1-)hept-5-ene-2,3-dicarboxylic acid anhydride.

(A) a solid substrate, and adhered thereto
(B) a modified polyolefin blend according to claim 1.

27. The composite structure of claim 26 wherein said substrate comprises a member of the class consisting of polar polymers, solid metals, glass, paper, wood and cellophane.

28. The composite structure of claim 26 wherein said substrate comprises nylon.

29. The composite structure of claim 26 wherein said substrate comprises aluminum.

30. The composite structure of claim 26 wherein said blend is according to claim 2.

31. The composite structure of claim 26 wherein said blend is according to claim 3.

32. The composite structure of claim 26 wherein said blend is according to claim 4.

33. The composite structure of claim 26 wherein said blend is according to claim 5.

34. The composite structure of claim 26 wherein said blend is according to claim 6.

35. The composite structure of claim 26 wherein said blend is according to claim 7.

36. The composite structure of claim 26 wherein said blend is according to claim 8.

37. The composite structure of claim 26 wherein said blend is according to claim 9.

38. The composite structure of claim 26 wherein said blend is according to claim 10.

39. The composite structure of claim 26 wherein said blend is according to claim 11.

40. The composite structure of claim 26 wherein said blend is according to claim 12.

41. The composite structure of claim 26 wherein said blend is according to claim 13.

42. The composite structure of claim 26 wherein said blend is according to claim 14.

43. The composite structure of claim 26 wherein said blend is according to claim 15.

44. The composite structure of claim 26 wherein said blend is according to claim 16.

45. The composite structure of claim 26 wherein said blend is according to claim 17.

46. The composite structure of claim 26 wherein said blend is according to claim 18.

47. The composite structure of claim 26 wherein said blend is according to claim 19.

48. The composite structure of claim 26 wherein said blend is according to claim 20.

49. The composite structure of claim 26 wherein said blend is according to claim 21.

50. The composite structure of claim 26 wherein said blend is according to claim 22.

51. The composite structure of claim 26 wherein said blend is according to claim 23.

52. The composite structure of claim 26 wherein said blend is according to claim 24.

53. The composite structure of claim 26 wherein said blend is according to claim 25.

54. The blend of claim 1 wherein said (A) comprises a high density copolymer of at least 60 wt.% ethylene and up to 40 wt.% of an alpha-olefin containing from 4 to 6 carbon atoms.

* * * * *

UNITED STATES PATENT AND TRADEMARK OFFICE
CERTIFICATE OF CORRECTION

PATENT NO. : 4,087,587
DATED : May 2, 1978
INVENTOR(S) : Mitsuzo Shida et al

It is certified that error appears in the above–identified patent and that said Letters Patent are hereby corrected as shown below:

Column 16, cancel line 58 after line 60, insert the following:

-- 26. A composite structure comprising: --

Signed and Sealed this

Fifth Day of September 1978

[SEAL]

Attest:

RUTH C. MASON
Attesting Officer

DONALD W. BANNER
Commissioner of Patents and Trademarks